(12) United States Patent
Lopez et al.

(10) Patent No.: US 7,369,137 B2
(45) Date of Patent: May 6, 2008

(54) METHOD FOR MAPPING A SINGLE DECODED CONTENT STREAM TO MULTIPLE TEXTURES IN A VIRTUAL ENVIRONMENT

(75) Inventors: Juan M. Lopez, Chicago, IL (US); Eric R. Buhrke, Clarendon Hills, IL (US); Julius S. Gyorfi, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 212 days.

(21) Appl. No.: 11/402,475

(22) Filed: Apr. 12, 2006

(65) Prior Publication Data

US 2007/0242078 A1 Oct. 18, 2007

(51) Int. Cl.
*G09G 5/00* (2006.01)
*H04N 7/14* (2006.01)
*H04N 11/04* (2006.01)

(52) U.S. Cl. .................. 345/582; 345/633; 345/552; 345/557; 345/419; 348/211.14; 348/14.08; 715/757; 715/706; 382/232; 382/285

(58) Field of Classification Search ............... 345/419, 345/581–582, 632–633, 536, 545, 547–549, 345/552–557, 502–503; 715/700, 706, 723, 715/740, 733–735, 748–753; 382/232, 285, 382/303–305; 348/211.12, 211.14, 14.8–14.1, 348/14.13, 14.14

See application file for complete search history.

(56) References Cited

U.S. PATENT DOCUMENTS 5,774,132 A 6/1998 Uchiyama

| 5,889,951 | A | * | 3/1999 | Lombardi | 709/219 |
| 5,990,902 | A | | 11/1999 | Park | |
| 5,999,185 | A | * | 12/1999 | Kato et al. | 345/420 |
| 6,339,428 | B1 | | 1/2002 | Fowler | |
| 2006/0092267 | A1 | * | 5/2006 | Dempski et al. | 348/14.07 |
| 2006/0238548 | A1 | * | 10/2006 | Stotts, Jr. et al. | 345/629 |
| 2007/0005804 | A1 | * | 1/2007 | Rideout | 709/246 |
| 2007/0263087 | A1 | * | 11/2007 | Hong et al. | 348/14.13 |

OTHER PUBLICATIONS

Ziegler, et al., Multi-Video Compression in Texture Space, MPI Informatik, Saarbrucken, Germany.

Matkovic, et al., Dynamic Texturing of Real Objects in an Augmented Reality System, IEEE Virtual Reality 2005, Bonn, Germany, pp. 245-248.

Pomi, et al., Streaming Video Textures of Mixed Reality Applications in Interactive Ray Tracing Environments, Saarland University, Computer Graphics Group, Saarbrucken, Germany, Nov. 2003.

* cited by examiner

*Primary Examiner*—Sajous Wesner
(74) *Attorney, Agent, or Firm*—Valerie M. Davis

(57) ABSTRACT

A system includes a computing device to obtain encoded content data corresponding to at least one participant of a virtual reality environment. A memory device stores at least one texture corresponding to the at least one participant. A single decoder decodes the encoded content data into decoded content buffers for the at least one texture of one participant of the virtual reality environment. A processor determines whether the at least one texture is located in a pre-determined region of the virtual reality environment displayed to a program user. In response to the at least one texture being located in the pre-determined region, the processor updates the at least one texture with the decoded content buffers.

20 Claims, 4 Drawing Sheets

METHOD FOR MAPPING A SINGLE DECODED CONTENT STREAM TO MULTIPLE TEXTURES IN A VIRTUAL ENVIRONMENT

TECHNICAL FIELD

This invention relates generally to the mapping of video streams onto textures in a 2-dimensional or 3-dimensional environment.

BACKGROUND

In a shared 3-dimensional ("3D") environment, there is a need for a virtual presence. For example, a decoded content stream of data such as audio or video may be acquired and then mapped onto multiple locations within a virtual reality computer program. These multiple locations can include 3D textures that may or may not be visible on the user's display screen simultaneously. For example, in a video-conference type of 3D environment, multiple different rooms may be utilized. In current systems, there can be a virtual presence of N participants in M number of rooms or groups. In these systems, however, a separate decoder/reader is utilized for each instance of a virtual participant. Accordingly, N×M decoders are utilized to decode/read all of the video for each separate instance of the virtual participants.

Use of this many decoders, however, is very taxing on the processing power utilized for generating the 3D environment. As a result, system performance slows and the virtual reality program may exhibit delays in displaying various aspects of the virtual environment. It is also inefficient to use a separate decoder for each different instance of the virtual participants. Specifically, the use of separate decoders to decode video for a participant of the virtual reality program is wasteful when the participant is not shown on the user's display screen, i.e., when that video/audio is not going to be presented to the user. That is, in the event that the user lacks a virtual presence in any of the rooms, processing bandwidth is wasted by decoding video/audio for instances of the virtual participants present in those rooms. Furthermore, in the event that video/audio for a single participant is to be presented in multiple rooms, it is wasteful to utilize two separate decoders to effectively decode the same content twice, i.e., one separate time for each instance.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
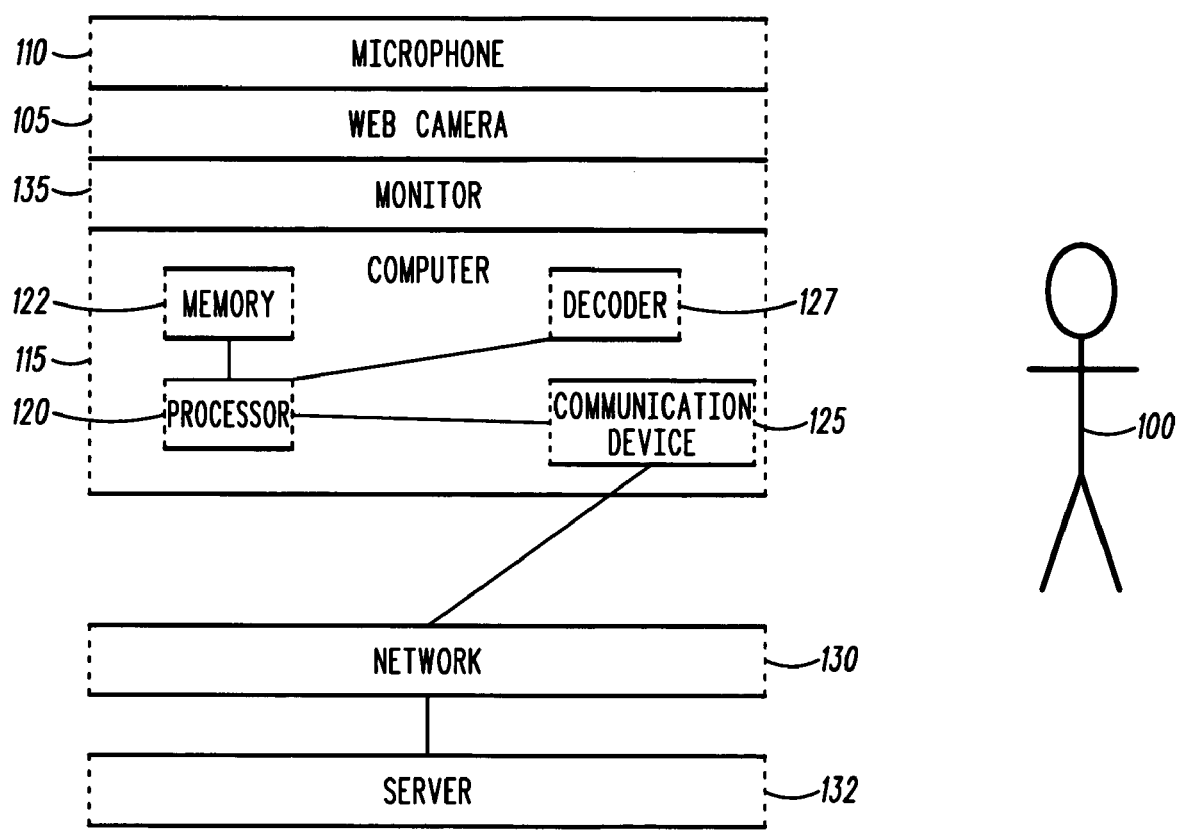
FIG. 1 illustrates a system for capturing video and audio of a user according to an embodiment of the invention.

Before describing in detail embodiments that are in accordance with the present invention, it should be observed that the embodiments reside primarily in combinations of method steps and apparatus components related to a method and apparatus for mapping a single decoded content stream to multiple textures in a virtual environment. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for mapping a single decoded content stream to multiple textures in a virtual environment described herein. As such, these functions may be interpreted as steps of a method to perform the mapping a single decoded content stream to multiple textures in a virtual environment described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to these various embodiments, a method, apparatus, and system are provided for mapping a single decoded content stream onto multiple textures in a 2-dimensional ("2D") or a 3-dimensional ("3D") environment. The decoded content may include, e.g., video, audio, still images, visualizations, slide shows, text documents, and so forth. The content is decoded by, e.g., a graphics processor within the user's computer. The encoded content may be received from a server on a network or may be stored locally on the participant/user's computer. The network may comprise the Internet.

In the event that a server is utilized, the encoded data may be sent via the Internet, a private intranet, or any other suitable network to the participant's computer. The encoded data is received by a participant's computer and is decoded into content buffers in memory. Once decoded, the decoded data may be mapped onto various textures. For the purposes of the discussion below, a "texture" is defined as any surface that can be drawn upon in a virtual environment or in the application user interface. The texture may be, e.g., a Java Mobile 3D Graphics ("M3G") texture, a Java Abstract Window Toolkit ("AWT") image, a 3D virtual environment drawable surface, a 2D drawable surface, or a user interface element.

The term "mapping" refers to associating a texture with a participant/content source, but not the actual rendering of the content buffers. For the purposes of the various embodiments discussed below, a participant refers to a person participating in the virtual environment. A participant's computer may provide content of the participant to the virtual environment, as discussed below with respect to FIG. 1. There are additional sources of the content stream, such as, e.g., a memory device on which pre-stored content may be stored. The pre-stored content may include images of a building, a text document, a pre-recorded video stream, and so forth. Each instance of a participant may be mapped onto different textures throughout various rooms of the 3D environment.

The decoded content may, e.g., be mapped onto only those textures in the participant's view. For example, there may be multiple different "rooms" in a virtual environment in which video-conferencing is performed. In some embodiments, only 1 room may be displayed on the participant's monitor at a time. Accordingly, because there is only 1 room displayed to the participant, processing bandwidth is conserved by only updating the video and audio data for those textures that are in the view of the participant, e.g., within a room being shown on the participant's display screen. Because the other textures are not shown on the participant's display screen, processing bandwidth is conserved by not updating such textures.

A display program in the participant's computer is given instructions as to how to map the buffers to the appropriate textures. The display program may be a software module implemented by, e.g., an application-specific processor within the participant's computer. The participant's computer, depending on the application, may utilize more than one application-specific processor.

As discussed above, a texture is basically a drawable surface. For example, the content buffer may include an image of the surface of the earth which may be applied to a sphere in the virtual environment to give the appearance of a globe. The image could also be applied to a planar rectangular surface to give the appearance of a 2D map.

Various embodiments described below may be utilized to implement a method in which encoded content data corresponding to at least one participant of a virtual reality environment is obtained. The encoded content data is then decoded into decoded content buffers. A single decoder performs the decoding of the encoded content data for at least one texture of one participant of the virtual reality environment. Next, a processing device determines whether the at least one texture is located in a pre-determined region of the virtual reality environment displayed to a program user. If the at least one texture is located in the pre-determined region, the at least one texture is updated with the decoded content buffers. Finally, the decoded content buffers are mapped to the at least one texture of the at least one participant. At least two mapped textures may be simultaneously displayed.

FIG. 1 illustrates a system for capturing video and audio of a participant 100 according to an embodiment of the invention. As shown, the participant 100 may sit or stand in front of a web camera 105 and a microphone 110. In some embodiments, the web camera 105 may be integral with the microphone 110. In other embodiments, the web camera 105 and the microphone 110 are separate devices. The web camera 105 and the microphone 110 are in communication with a computer 115. The computer 115 includes a processor 120, a memory 122, a communications device 125, and a decoder 127. The memory 122 may, e.g., store program code to be executed by the processor 120. The processor 120 receives video data from the web camera 105 and audio data from the microphone 110 and encodes and converts this data into a format to be transported by the communications device 125 across a network 130. The communications device 125 may be, e.g., a modem or other device for communicating data. The network 130 may be the Internet, a proprietary network, or any other suitable network for allowing the transmission of data. The network 130 may utilize the Internet Protocol ("IP") to transfer the data. The computer 115 may be in communication with a monitor 135 for displaying, e.g., video and audio data of another participant received from the network 130. The processor 120 may include graphics and audio processing capabilities or may be in communication with a graphics and audio processor. The computer may further be in communication with a server 132 via the network 130 for obtaining additional encoded content such as, for instance, video, audio, still images, visualizations, slide shows, text documents and so forth. The network 130 may comprise the Internet.

The computer 115 and other computers across the network 130 may implement a 3D virtual reality environment to allow for virtual video-conferencing. The virtual reality environment may include a Virtual Incident Command Center ("VICC") in which any user/participant has access to at least one room, and sometimes more than one room. In each room a video-conference may be taking place. A participant may participate and speak in more than one room at a time. A practical use of this type of 3D environment would be for emergency management purposes.

For example, members of the police department may be present in one room, members of the fire department may be present in another room, and paramedics may be present in a third room. A building engineer and the mayor of the city in which the police department, the fire department, and paramedics are located may be present in all three rooms at the same time. Accordingly, the mayor may sit in front of the web camera 105 and microphone 110 and/or some other type of video/audio processing device and communicate instructions to the fire department, police department, and the paramedics at the same time. The building engineer may also communicate in these 3 rooms while displaying, e.g., a 3D model of a building and showing the various entrances and exits in the event of an emergency situation at that building. Members of the fire department may, e.g., communicate amongst themselves until the video/audio of the mayor interrupts to give instructions as to how to proceed in the emergency situation. Accordingly, these different entities may all participate in a virtual video-conference without having to set up and install expensive hardware equipment at multiple different locations.

It should be appreciated that content other than video images may also be utilized/shared within the virtual environment. For example, audio, still images, visualizations (such as a 3D image of a building), slide shows, and text documents may also be utilized. Furthermore, a 2D environment may be utilized instead of a 3D environment.

The communication device 125 may receive encoded content of the participants in the virtual environment. The decoder 127 in the computer 115 may then decode this content. In some embodiments, the encoded content may be received directly from the memory 122, instead of from the network 130. The encoded content is subsequently decoded as discussed below with respect to FIGS. 4 and 5.

Figure 2:
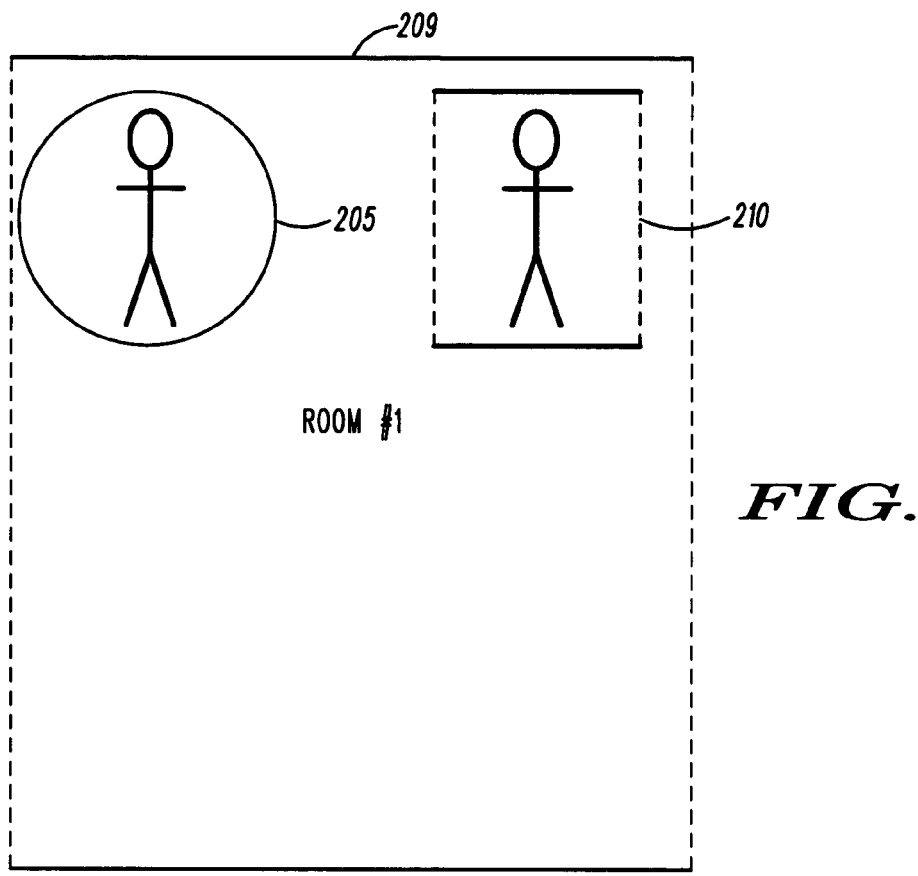
FIG. 2 illustrates a room in a virtual environment according to an embodiment of the invention.

FIG. 2 illustrates a room 200 in a virtual environment according to an embodiment of the invention. As shown, the room 200 includes two participants. Video for each of the participants is shown with its own texture. As illustrated, video of a first participant is shown applied to texture 205, while video of a second participant is shown applied to texture 210. Audio of the first participant may also be applied to texture 205, and audio of the second participant may be applied to texture 210. Although texture 205 and texture 210 are shown as having different shapes/dimensions, it should be appreciated that the same shapes/dimensions could also be used for texture 205 and texture 210. Encoded video of both of the participants may be received from the server 132 across the network 130. The participant's 100 processor 120 may already have knowledge of texture 205 and texture 210 based on pre-stored settings or may receive data relating to these textures from the server 132.

When the encoded content of the participants is received, it is decoded and then mapped or applied to the textures of those participants in those rooms being currently viewed by the participant 100. In this case, encoded video images and audio data, if included, of the first participant are received, decoded, and then applied to texture 205. In the event that, e.g., texture 205 is an AWT texture, content such as audio and video for the first participant is mapped or applied to texture 205, and is therefore viewable on texture 205. Accordingly, anyone viewing room 200 will see texture 205 and see the video content and see and/or hear the audio content corresponding to the first participant. Similarly, encoded video and audio data, if included, of the second participant is received, decoded, and then applied to texture 210.

Figure 3:
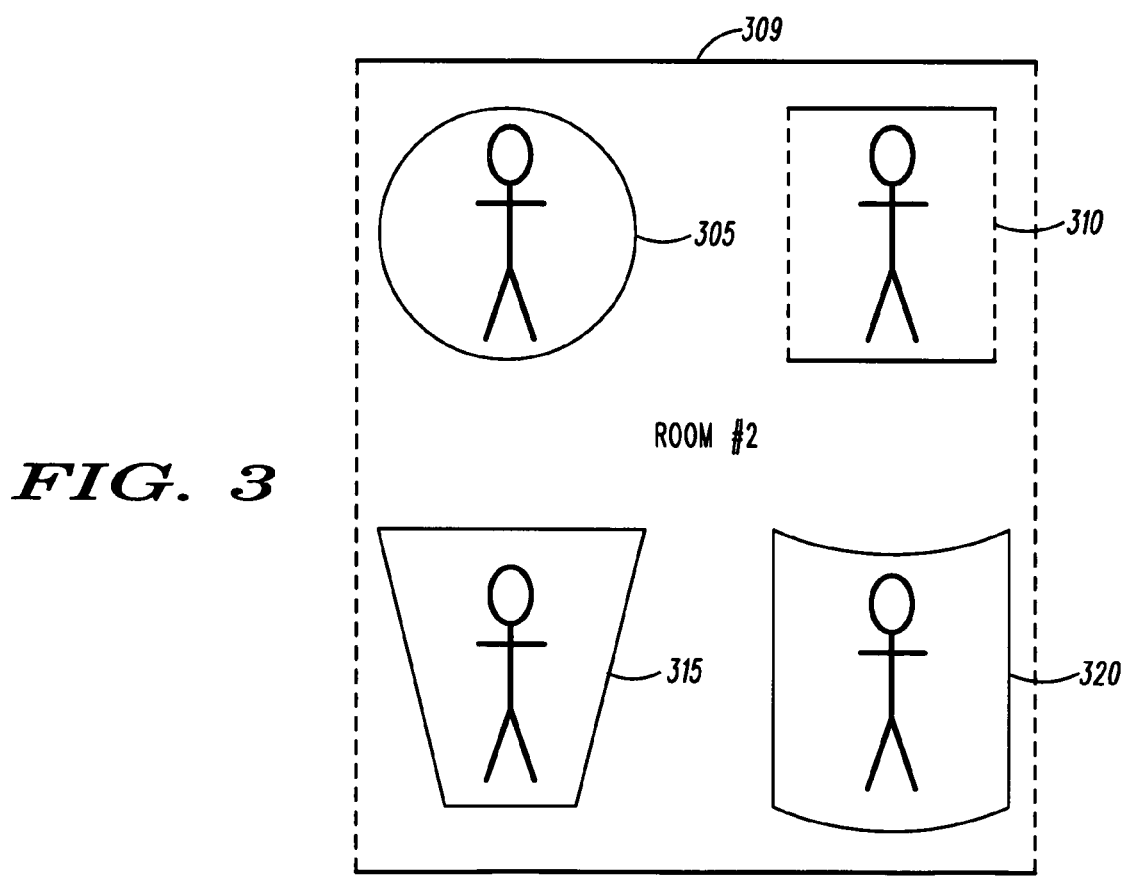
FIG. 3 illustrates a second room in a virtual environment according to an embodiment of the invention.

FIG. 3 illustrates a second room 300 in a virtual environment according to an embodiment of the invention. As shown, the second room 300 includes four participants. Video images and audio content, if any, of the four participants are applied to texture 305, texture 310, texture 315, and texture 320, respectively. As discussed above with respect to FIG. 2, encoded content of each of these participants is received from the server 132 via the network 130 or from the computer's memory 122 and is decoded and applied to texture 305, texture 310, texture 315, and texture 320, respectively.

The video images and audio content, if any, for the two participants of room 200 of FIG. 2 may also be shown in room 300 of FIG. 3. For example, the video images applied to texture 205 of room 200 may be applied to texture 320 of room 300. As shown, the same video images of this participant are therefore applied to different textures, i.e., texture 205 and texture 320, in room 200 and room 300, respectively. Similarly, video images and audio content, if any, of another participant applied to texture 210 in room 200 may be applied to texture 315 in room 300. Accordingly, the texture to which the content corresponding to a participant is applied may vary, depending on the room being viewed.

Also, in the event that content is received for participants in rooms not currently being viewed by the participant 100, processing power is conserved by not applying or updating such content to the textures in rooms not being viewed by the participant 100. For example, in the event that the participant 100 is only viewing room 200 at the time, only the content received for the two participants of room 200 are applied/updated to texture 205 and texture 210, respectively. Content for these participants are not, however, applied/updated to texture 320 and texture 315, respectively, because room 300 is not currently being viewed by the participant 100. Moreover, content for the two participants of room 300 are also not applied to texture 305 and texture 310, respectively, because the participant 100 is only viewing room 200.

Therefore, as discussed above, encoded content of participants is received at a participant's 100 computer 115. This content is decoded and then applied to the textures of participants only in the rooms currently being viewed by the participant 100, in an effort to conserve processing power. Also, a single encoded stream of content may be decoded and applied to a variety of different textures, depending on the room that the participant 100 is currently viewing.

The processor 120 may execute code stored in the memory 122. The processor 120 or a decoder 127 may initially map a decoded content stream onto multiple textures, regardless of whether both are simultaneously within the room being viewed by the participant 100. After this initial mapping, decoded content is only updated for those textures in the participant's 100 view. Textures not in the participant's 100 view maintain a paused state until brought into the participant's 100 view such as, e.g., when the participant 100 views a different room of the virtual environment.

In some embodiments, both room 200 and room 300 may be simultaneously displayed to the user. Accordingly, the decoded content for a single participant may be, e.g., mapped to two different textures simultaneously, such as texture 205 of room 200 may be applied to texture 320 of room 300.

Figure 4:
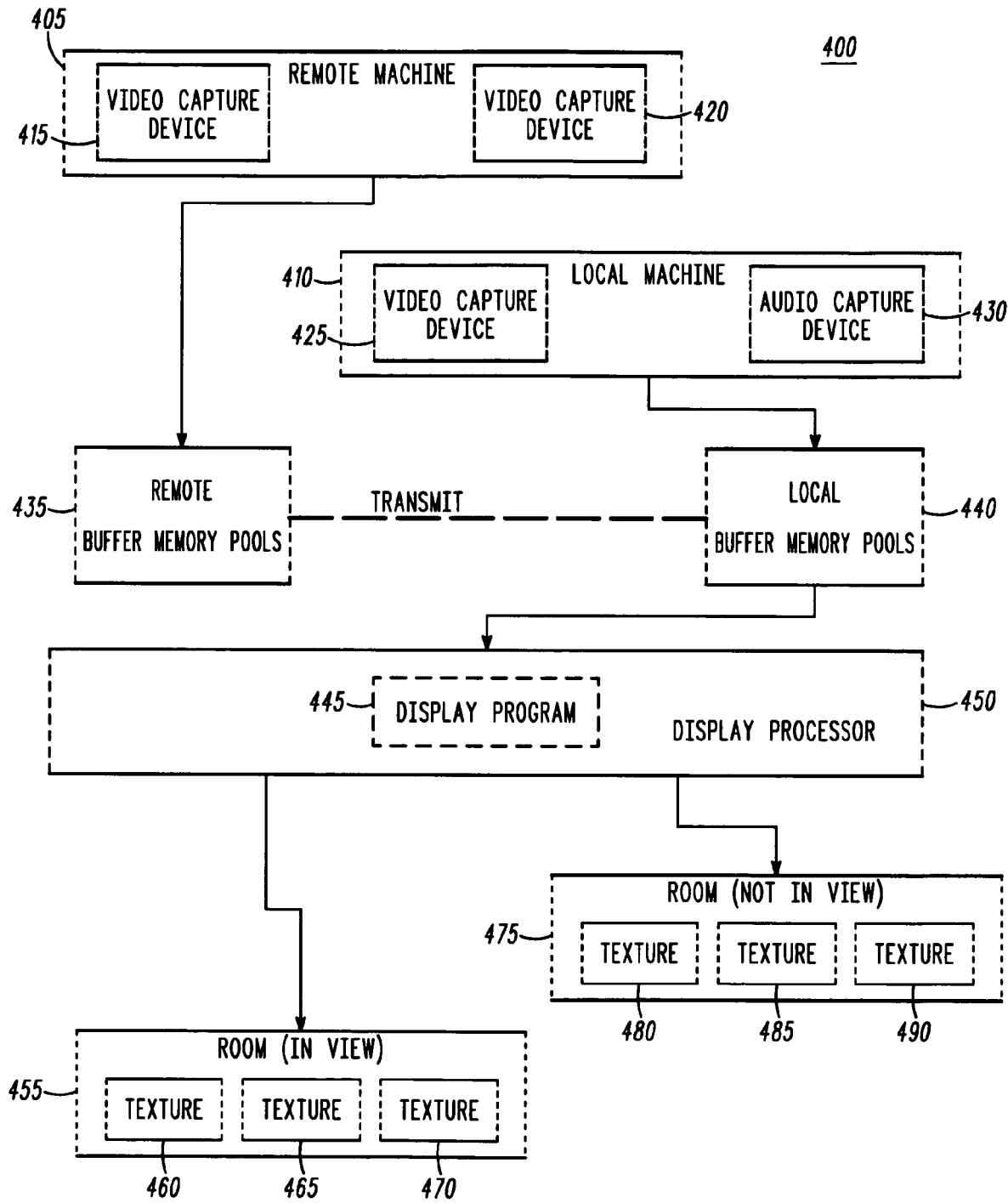
FIG. 4 illustrates a high level diagram of a system according to an embodiment of the invention.

FIG. 4 illustrates a high level diagram of a system 400 according to an embodiment of the invention. As shown, the system 400 includes a remote machine 405 and a local machine 410. The remote machine 405 may be a computer, similar to the computer described above with respect to FIG. 1, having a video capture device 415 and an audio capture device 420. The video capture device 415 may comprise a web camera, and the audio capture device 420 may comprise a microphone. Similarly, the local machine 410 includes a video capture device 425, such as a web camera, and an audio capture device 430 such as a microphone. Although only one remote machine 405 and one local machine 410 are shown, it should be appreciated that multiple remote machines 405 and local machines 410 may also be utilized, depending on the application.

The remote machine 405 encodes content captured by the video capture device 415 and the audio capture device 420, respectively, and transmits this encoded data to remote buffer memory pools 435. This encoded data is subsequently transmitted to local buffer memory pools 440. Encoded video and audio data captured by the video capture device 425 and the audio capture device 430, respectively, of the local machine 410 are also transmitted to the local buffer memory pools 440. A buffer includes, e.g., a single video image or audio data. Many buffers may be stored in the remote buffer memory pools 435 and the local buffer memory pools 440.

The encoded data is sent from the local buffer memory pools 440 to a display program 445. The display program 445 may be implemented by a display processor 450. Although not shown, the display processor 450 may be located within the local machine 410. The display program 445 decodes and formats the encoded data. The display program 445 may include a decoder 447. The display program 445 also associates the decoded data with corresponding textures. For those textures, e.g., in a room 455 in the participant's view, decoded data is applied to texture 460, texture 465, and texture 470, respectively. For those textures, e.g., in a room 475, which is not in the participant's view, decoded data is initially applied to texture 480, texture 485, and texture 490. However, updated content such as audio data or video images of the decoded data are not applied to these textures for as long as the participant is not viewing room 475.

Figure 5:
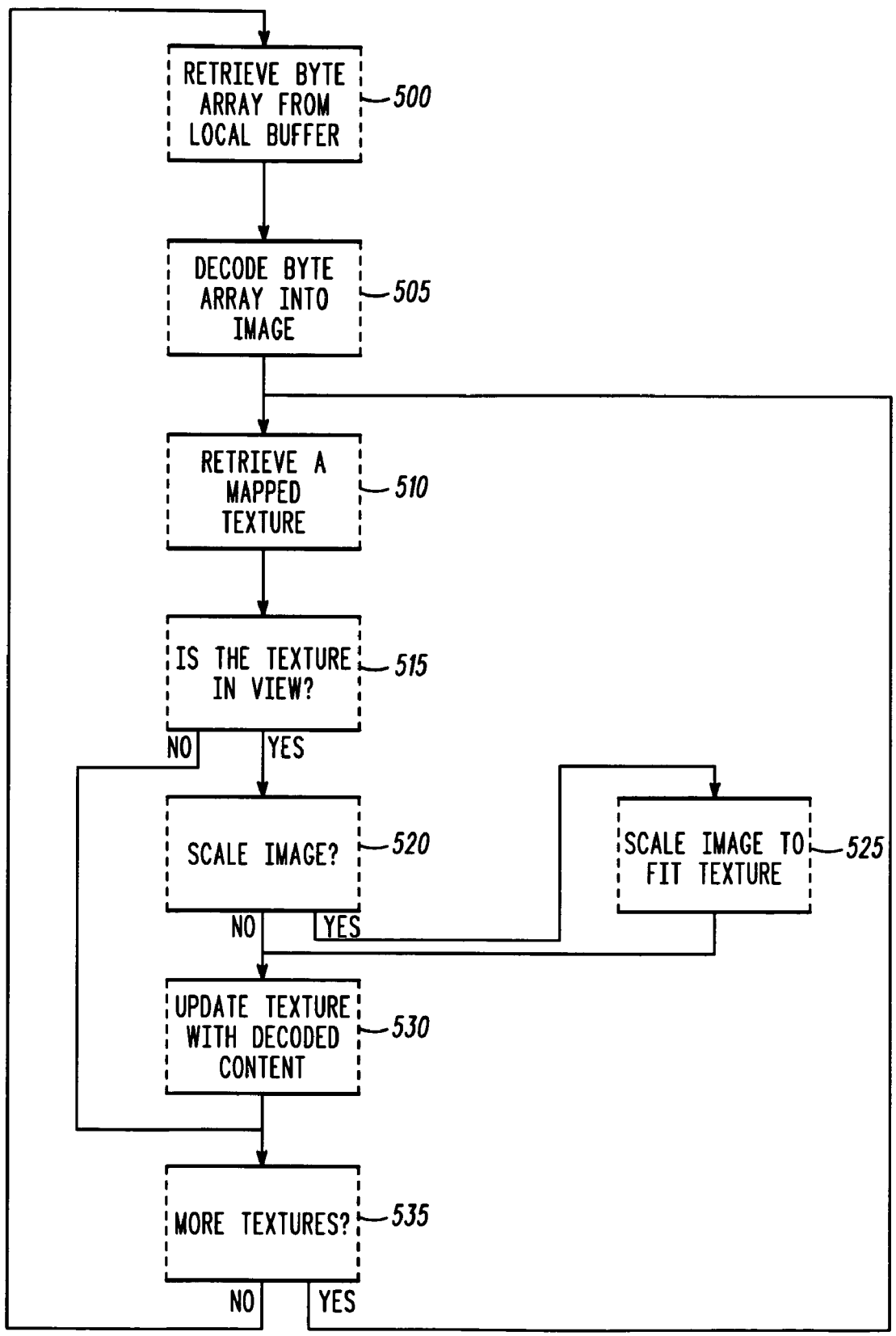
FIG. 5 illustrates a method of displaying video texture images according to an embodiment of the invention.

FIG. 5 illustrates a method of displaying video texture images according to an embodiment of the invention. First, at operation 500, a byte array, i.e., a buffer, is retrieved from the local buffer memory pools 440. This byte array is then decoded into an image by the display processor 445 at operation 505. A mapped texture is then retrieved from memory at operation 510. The display processor 445 then determines whether the texture is within the participant's view at operation 515. If "no," processing proceeds to operation 535. If "yes," the size of image is compared to the size of the texture and a determination of whether the image needs to be scaled is made at operation 520. If the image fits inside the texture and therefore no scaling is required, processing proceeds to operation 530. If, however, the image is too large to fit inside the texture, and scaling is required, the image is scaled to fit inside the texture at operation 525. The texture is then updated with the decoded content at operation 530. Finally, at operation 535, the processor determines whether there are any remaining textures in the participant's view to be updated. If "no," processing returns to operation 500. If "yes," processing returns to operation 510.

Pursuant to these various embodiments discussed above, a method, apparatus, and system are provided for a mapping a single decoded content stream onto multiple textures in a 2D or a 3D environment. The decoded content may include, e.g., video, audio, still images, visualizations, slide shows, text documents, and so forth. The content is decoded by, e.g., a graphics processor within the participant's computer. The encoded content may be received from a server on a network or may be stored locally on the participant's computer.

In the event that a server is utilized, the encoded data may be sent via the Internet, a private intranet, or any other suitable network to the participant's computer. The encoded data is received by a participant's computer and is decoded into content buffers in memory. Once decoded, the decoded data may be mapped onto various textures. Each instance of a participant may be mapped onto different textures throughout various rooms of the 3D environment.

The decoded content may, e.g., be mapped onto only those textures in the participant's view. In some embodiments, only one room may be displayed on the participant's monitor at a time. Accordingly, because there is only one room displayed to the participant, processing bandwidth is conserved by only updating the video data for those textures that are in the view of the participant, e.g., within a room being shown on the participant's display screen. Because the other textures are not shown on the participant's display screen, processing bandwidth is conserved by not updating such textures.

A display program in the participant's computer is given instructions as to how to map the buffers to the appropriate textures. The display program may be a software module implemented by, e.g., an application-specific or display processor within the participant's computer. The participant's computer, depending on the application, may utilize more than one application-specific processor.

Various embodiments described above may be utilized to implement a method. Encoded content data corresponding to at least one participant of a virtual reality environment is obtained. The encoded content data is then decoded into decoded content buffers. A single decoder performs the decoding of the encoded content data for at least one texture of one participant of the virtual reality environment. Next, a processing device determines whether the at least one texture is located in a pre-determined region of the virtual reality environment displayed to a program user. If the at least one texture is located in the pre-determined region, the at least one texture is updated with the decoded content buffers. Finally, the decoded content buffers are mapped to the at least one texture of the at least one participant. At least two mapped textures may be simultaneously displayed.

Therefore, as discussed above with respect to the various embodiments, a superior system, method, and apparatus is provided for mapping a single decoded content stream onto multiple textures in a virtual 2D or 3D environment. Processing bandwidth is minimized by updating only those textures within the user's view with decoded content, instead of all of the textures. Moreover, by using a single decoder to decode the media content for potentially multiple different instances of a participant in the virtual environment, processing resources are also conserved.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

We claim:

1. A method, comprising:
    obtaining encoded content data corresponding to at least one participant of a virtual reality environment;
    decoding the encoded content data into decoded content buffers, wherein a single decoder performs the decoding of the encoded content data for at least one texture of one participant of the virtual reality environment;
    determining whether the at least one texture is located in a pre-determined region of the virtual reality environment displayed to a program user, wherein in response to the at least one texture being located in the pre-determined region, the at least one texture is updated with the decoded content buffers; and
    mapping the decoded content buffers to the at least one texture of the at least one participant.

2. The method of claim 1, further comprising generating the virtual reality environment and providing at least two different virtual rooms accessible to the at least one participant.

3. The method of claim 1, further comprising simultaneously displaying at least two mapped textures.

4. The method of claim 1, further comprising updating the encoded content data only for the at least one texture displayed to the program user.

5. The method of claim 1, wherein the at least one texture is at least one of a Java Mobile 3D Graphics ("M3G") texture, a Java Abstract Window Toolkit ("AWT") image, a 3D virtual environment drawable surface, a 2D drawable surface, and a user interface element.

6. The method of claim 1, wherein the content data includes at least one of: video, audio, still images, a visualization, a slide show, and a text document.

7. A system, comprising:
    a computing device to obtain encoded content data corresponding to at least one participant of a virtual reality environment;
    a memory device to store at least one texture corresponding to the at least one participant;
    a single decoder to decode the encoded content data into decoded content buffers for the at least one texture of one participant of the at least one participant; and
    a processor to determine whether the at least one texture is located in a pre-determined region of the virtual reality environment displayed to a program user, wherein in response to the at least one texture being located in the pre-determined region, the processor updates the at least one texture with the decoded content buffers.

8. The system of claim 7, further comprising a monitor to display the pre-determined region.

9. The system of claim 8, wherein the monitor simultaneously displays at least two mapped textures in the pre-determined region.

10. The system of claim 7, further comprising a second decoder to decode at least one texture of a second participant of the at least one participant.

11. The system of claim 7, the processor being adapted to update the encoded content data only for the at least one texture displayed to the program user.

12. The system of claim 7, further comprising at least one remote memory pool to store the encoded content data from a remote machine.

13. The system of claim 7, further comprising at least one local memory pool to store the encoded content data from at least one of the computing device and a remote machine.

14. The system of claim 7, further comprising a server to provide the encoded content data to the computing device via a network.

15. The system of claim 13, wherein the network is the Internet.

16. An apparatus, comprising:
    a decoder to decode encoded content data into decoded content buffers;
    a display processor to obtain the encoded content data corresponding to at least one participant of a virtual reality environment, determine whether at least one texture is located in a pre-determined region of the virtual reality environment displayed to a program user, map the decoded content buffers to the at least one texture of the at least one participant, and wherein in response to the at least one texture being located in the pre-determined region, the at least one texture is updated with the decoded content buffers.

17. The apparatus of claim 16, the apparatus being housed within a computer.

18. The apparatus of claim 16, further comprising a web camera to acquire video content corresponding to the program user.

19. The apparatus of claim 16, further comprising a microphone to acquire audio content corresponding to the program user.

20. The apparatus of claim 16, further comprising a communication device to receive the encoded content data from a remote machine.

* * * * *